Patented Oct. 23, 1945

2,387,557

UNITED STATES PATENT OFFICE 2,387,557

COOLING AND HEATING LIQUIDS

Ludwig Beer, Herbert Berg, and Wolfgang Gruber, Burghausen, Germany; vested in the Alien Property Custodian No Drawing. Application March 10, 1941, Serial No. 382,664. In Germany March 15, 1940

4 Claims. (Cl. 252—73)

This invention relates to heat exchange media and more particularly to a novel type of heat exchange liquid suitable for control of temperatures in thermal chemical processes, for example, catalytic exothermic chemical reactions.

The art presents numerous examples in which the utilization of heat exchange liquids by cooling or heating is desirable. Such liquid should be cheap and resistant to change during continuous operations. It should have a high boiling point in order to avoid the use of pressure apparatus; in spite of this, however, it should be stable to such a degree that—even at temperatures above 200° C.—it does not cause formation of incrustations on the cooling or heating surfaces, nor should it corrode the surfaces. A great difficulty is added by the fact that usually metallic, especially iron, surfaces are utilized which have a catalytic decomposing effect on most of the high boiling organic substances. Further, in spite of its high boiling point, such liquid should be fluid, preferably a thin fluid, at ordinary temperatures. If the cooling or heating requires that the liquid is pumped in circulation, a new requirement is added: the liquid must not destroy lutings, stuffing boxes and the like by dissolving oils or greases used therein.

Of the high boiling liquids hitherto taken into consideration it may be noted that e. g. diphenyl proposed for the heating of baking ovens is much too expensive to be generally applied; besides this, it freezes at 70.5° C. High boiling oils of the type of tricresyl-phosphate, the phthalic acid esters and the like are also too expensive and decompose surprisingly rapidly in iron vessels at temperatures between 150–200° C., whereby the heat transferring surfaces become incrusted. Glycerol decomposes still more rapidly. Also oils of the type of the superheated steam cylinder oils—naturally desirable because of their cheapness—resinify too rapidly. Moreover their high viscosity at ordinary temperature is a great disadvantage.

An object of the present invention is to provide an improved type of heat exchange liquid. A further object is to provide a heat exchange liquid especially suitable for the thermal control of chemical reactions, for example, exothermic catalytic reactions. Another object is a heat exchange liquid which may be circulated by pumping or otherwise without removing lubricants used in stuffing boxes, packing glands and similar sealing devices. Another object is to control the reaction temperature of chemical reactions by means of the herein described novel heat exchange liquids, especially in the catalytic addition reactions of acetylene, for example to produce vinyl esters and the like. Still other objects will be apparent from the following description.

Now it has been found that isophorone, which may be obtained very cheaply from the distillation residues in the manufacture of acetone, possesses certain properties desirable for a heat exchange liquid as described above, especially for its capacity for dissolving oils, which is also common to diphenyl, phthalic acids esters, glycerol and the like. For a number of applications it represents an ideal heat exchange liquid particularly in combination with steam cylinder oil.

The suitability of isophorone as a heat exchange liquid was unexpected because it would be expected to tend to decompose and because this substance resinifies rapidly indeed when heated in the air. The exclusion of air, however, can readily be accomplished in practice.

Still more surprising is the further discovery that the addition of isophorone prevents the decomposition of liquids inclined naturally to decompose at high temperatures. Since isophorone is found in the high boiling fractions of the last runnings of the distillation of acetone, e. g. acetone oil boiling between 161° C. and 187° C. or between 188° C. and 211° C., it is possible to utilize these cheaper fractions of acetone instead of isolated isophorone. Moreover, it becomes possible to add oils which alone are useless but which are capable of raising the boiling point, especially, for example, the cheap superheated steam cylinder oils which have a lubricating effect on packings and stuffing boxes. By these lubricating oils, made useful by the combination with isophorone according to the invention, it has been possible for the first time—in spite of the natural capability of the isophorone to dissolve oils—to circulate high boiling heat exchange liquids for continuous operations with the aid of pumps. Thus there has been found a method for solving the difficulties in those cases where large quantities of heat must be led off or added through relatively small surface areas.

Various proposals for apparatus in which heat exchange liquids may be used have been made heretofore. For example in a heat exchanger for carrying out exothermal catalytic gas reactions, provided with numerous thin walled tubes vertically arranged and containing the granular or pulverulent catalyst, and having two tube sheets at the ends of the tubes, whereby a central space provided with two openings—one for leading off and one for adding a refrigerant—is separated from two headers each provided with an opening, one for leading off and one for adding reaction gases. Hereby superheated zones in the catalyst, which cause secondary reactions and soon deteriorate the catalyst, are avoided. Therefore it is no longer necessary to keep the temperature below the optimum in those parts of the reaction space entered first by the reaction components, a method known to reduce the capacity of the whole reaction space. By uniform regulation of the temperature, also the high rate of flow of the reaction components—formerly necessary for avoiding local superheating and thereby reducing the concentration of the reaction products—can be much diminished. By avoiding both disadvantages it is possible to increase the capacity of accessory apparatus such as evaporators, preheaters, condensers for reaction products and circulation pumps. At the same time the required expense of heating is importantly reduced.

The mode of applying cooling or heating liquids containing isophorone including the arrangement of the apparatus for heat exchange, depends naturally on the thermal and chemical conditions in each case. For example, for producing vinyl acetate in the above described tube reactor, it has been found useful to have the diameter of the catalyst tubes not wider than 50 mm. It has been found that the catalyst can be introduced very easily even if the tubes are narrower than 50 mm. and that the filling is much more uniform than it would be in a reactor having a single catalyst tube of large diameter. The discharging of spent catalyst from the narrow tubes can also be easily carried out e. g. with the aid of hot water or vapors whereby even no dust is formed. One of the numerous possibilities of applying the new liquids may be illustrated by the following description of producing vinyl acetate:

The well-known catalyst, consisting of active carbon impregnated with zinc acetate, was introduced in the tubes of a tube reactor as described above, which was provided with 51 tubes of 35 mm. diameter, of a length of 155 cm. and of a capacity of 76 liters. The oil container, provided with inlet and outlet tubes for the heat exchange liquid, contained about 90 liters. By means of a pump, the oil circulated through the apparatus, which included a heater and a condenser. After removing the air by replacement with nitrogen, the whole oil system was filled up with a mixture of one part of acetone oil of the boiling point of 188–211° C. and two parts of superheated steam cylinder oil. In order to condense the acetone oil which evaporizes at the higher end temperatures, a condenser filled with nitrogen was connected with the oil container. Boiling did not occur below 210° C.

At the beginning of the oil circulation the oil was heated at first up to 160° C. Then a mixture of acetylene and vapors of acetic acid, heated in a preheater up to 155° C., was blown through the catalyst tubes in such a way, that the mixture entered the apparatus at the bottom and left it at the top. The mixture of gas vapors leaving the reactor was freed from the vinyl acetate formed and excess acetic acid by a condenser. The unreacted acetylene was led back into the process by circulation together with some fresh acetylene after having removed some waste gas. With an acetylene circulation of 7 cubic meters per hour and a throughput of 8.2 kg. of acetic acid per hour (ratio of acetylene to acetic acid=100:50, time of stay in the reactor, 25 sec.), the condensed crude reaction product contained 50% of vinyl acetate. With an acetylene circulation of 7 cubic meters per hour and a throughput of only 5.7 kg. of acetic acid per hour (ratio of 100:35, time of stay in the reactor 28.8 sec.) a raw product containing 80–90% of vinyl acetate was obtained. With an acetylene circulation of 8.1 cubic meters per hour and a throughput of 5.7 kg. of acetic acid per hour (ratio of 100:30, time of stay 25.8 sec.) the resulting vinyl acetate concentration was 96%. After 1310 hours the catalyst was not yet spent. During this time the temperature of the cooling liquid was gradually increased up to 212°, while the temperature within the catalyst tubes correspondingly rose to 213–215°. The average production was 1.6 kg. of vinyl acetate per liter of catalyst space, per day. If working in order to get especially high capacities—which can be attained by sacrificing an extremely high concentration of vinyl acetate and also by a somewhat more rapid rise of the reaction temperature—production of up to 2 kg. of vinyl acetate per liter, per day can be obtained.

The effect of the regulation of the temperature according to the invention is shown by an extremely uniform regulation of the particularly desired temperature throughout the entire catalyst space. The result is—beside the increase of the output and the concentration—a complete absence of by-products like acetone and ethylidene diacetate which otherwise are obtained, and a large decrease of decomposition gases. The vinyl acetate obtained is very readily polymerized and is especially pure. For instance, in massive polymerization the undesired red color of the polymers does not occur. By elimination of the side-reactions, the life of the catalyst is naturally prolonged. The packings and stuffing boxes are permanently and automatically relubricated. In this process, the reactor and all accessories have a much greater capacity than those in the mode of operation utilized heretofore.

For comparison: a single tube reactor yielded, under the same working conditions but without the described regulation of temperature by oil, only an output of 0.9–1 kg. of vinyl acetate per liter of catalyst space, per day—the concentrations of vinyl acetate lying between 12–18%—although the throughput was four times larger and the ratio of acetylene to acetic acid was 100:20. Thereby the obtained vinyl acetate contained remarkable amounts of acetone and other impurities. Working in this way it is of course also possible to increase the concentration of the produced vinyl acetate by diminishing the throughput and increasing the reaction temperatures, but thereby the output is reduced and the impurities increased to an important extent.

The application of the new cooling and heating liquids, as described above by way of example, can be varied to a wide extent and thereby it can be usefully applied for various kinds of heating and cooling.

By usefully applying liquids containing isophorone in accordance with the present invention, the following thermal processes also can be improved: the production of vinyl chloride, of vinyl acetylene, of acrylic acid nitrile and the like, condensation reactions as for instance the well-known condensation of diamines with dicarbonic acids and polymerizations carried out continuously in tube shaped systems, and the like.

The invention claimed is:

1. A liquid heat exchange medium for regulating the temperature of exothermic catalytic reactions consisting essentially of isophorone in an amount sufficient to prevent the decomposition of the oil at a temperature above 100° C. and a steam cylinder oil which has a lubricating effect on packings and stuffing boxes.

2. A liquid heat exchange medium for regulating the temperature of exothermic catalytic reactions consisting essentially of a mixture of an acetone oil containing isophorone and a steam cylinder oil.

3. A liquid heat exchange medium for regulating the temperature in producing a catalytic reaction consisting essentially of an acetone oil boiling at 188 to 211° C. and a steam cylinder oil.

4. A liquid heat exchange medium for regulating the temperature in producing a catalytic reaction consisting of one part of acetone oil boiling at 188–211° C. and 2 parts of steam cylinder oil.

LUDWIG BEER.
HERBERT BERG.
WOLFGANG GRUBER.